(12) United States Patent
Colgrave

(10) Patent No.: US 7,954,085 B2
(45) Date of Patent: May 31, 2011

(54) SUPPORT FOR MULTIPLE INTERFACE VERSIONS

(75) Inventor: John Colgrave, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1639 days.

(21) Appl. No.: 11/243,229

(22) Filed: Oct. 4, 2005

(65) Prior Publication Data

US 2006/0080676 A1    Apr. 13, 2006

(30) Foreign Application Priority Data

Oct. 8, 2004    (GB) .................................. 0422357.4

(51) Int. Cl.
G06F 9/44 (2006.01)
G06F 3/00 (2006.01)
G06F 9/46 (2006.01)
G06F 13/00 (2006.01)

(52) U.S. Cl. ........ 717/120; 717/168; 717/170; 717/171; 719/318

(58) Field of Classification Search .................. 717/170, 717/172, 175, 168, 171; 709/203, 187; 719/311, 719/318
See application file for complete search history.

(56) References Cited

U.S. PATENT DOCUMENTS

| | | | | |
|---|---|---|---|---|
| 5,796,633 A * | 8/1998 | Burgess et al. | ................ | 702/187 |
| 6,052,710 A * | 4/2000 | Saliba et al. | ................... | 709/203 |
| 6,442,570 B1 * | 8/2002 | Wu | ................ | 707/621 |
| 6,457,013 B1 * | 9/2002 | Saxton et al. | ................. | 707/795 |
| 6,493,768 B1 * | 12/2002 | Boutcher | ...................... | 719/330 |
| 6,549,918 B1 * | 4/2003 | Probert et al. | ........................ | 1/1 |
| 6,658,625 B1 * | 12/2003 | Allen | ............................ | 715/236 |
| 6,944,642 B1 * | 9/2005 | Hopmann et al. | ............ | 709/203 |
| 6,971,093 B1 * | 11/2005 | Spring | ......................... | 717/170 |
| 7,000,230 B1 * | 2/2006 | Murray et al. | ................ | 717/172 |
| 7,055,147 B2 * | 5/2006 | Iterum et al. | ................... | 717/170 |
| 7,065,771 B1 * | 6/2006 | Prabhu et al. | ................. | 719/330 |
| 7,246,351 B2 * | 7/2007 | Bloch et al. | ................... | 717/175 |
| 7,506,334 B2 * | 3/2009 | Curtis et al. | .................. | 717/170 |
| 7,539,985 B2 * | 5/2009 | Marvin | ......................... | 717/170 |
| 2002/0004848 A1 * | 1/2002 | Sudarshan et al. | ............ | 709/310 |
| 2003/0145315 A1 * | 7/2003 | Aro et al. | ....................... | 717/170 |
| 2003/0187992 A1 * | 10/2003 | Steenfeldt et al. | ............. | 709/227 |
| 2004/0216133 A1 * | 10/2004 | Roush | ........................... | 719/316 |
| 2005/0257210 A1 * | 11/2005 | Stienhans et al. | ............. | 717/170 |

(Continued)

OTHER PUBLICATIONS

Brown et al, "Best practices for Web services versioning", http://www.ibm.com/developerworks/library/ws-version/, Jan. 30, 2004, pp. 1-10.*

Ogbuji, "Using WSDL in SOAP applications", http://www.ibm.com/developerworks/webservices/library/ws-soap/, Nov. 1, 2000, IBM, pp. 1-7.*

(Continued)

*Primary Examiner* — Emerson C Puente
*Assistant Examiner* — Charles Swift
(74) *Attorney, Agent, or Firm* — Steven L. Nichols; Van Cott, Bagley, Cornwall & McCarthy P.c.

(57) ABSTRACT

Multiple interface versions including a current interface version and at least one earlier interface version are supported. A call is received at an interface version. A data structure from the current interface version data structures is retrieved. An event comprising a reference to the call is fired. Listeners for events are provided. A listener initiates the processing of a side effect of the current interface version, if appropriate to the call, wherein a side effect is a process in addition to the main purpose of the interface.

20 Claims, 5 Drawing Sheets

U.S. PATENT DOCUMENTS

2005/0262495 A1* 11/2005 Fung et al. .................. 717/170

OTHER PUBLICATIONS

Brittenham et al, "Understanding WSDL in a UDDI registry, Part 1", http://www.ibm.com/developerworks/webservices/library/ws-wsdl/, Sep. 1, 2001, pp. 1-14.*

Brittenham, "Understanding WSDL in a UDDI registry, Part 2", http://www.ibm.com/developerworks/webservices/library/ws-wsdl2.html, Sep. 1, 2001, pp. 1-22.*

Brittenham, "Understanding WSDL in a UDDI registry, Part 3", http://www.ibm.com/developerworks/webservices/library/ws-wsdl3.html, Sep. 1, 2001, pp. 1-10.*

"Best Practices for Web services versioning" http://www-106.ibm.com/developerworks/webservices/library/ws-version/.

"RE:[uddi-spec] Issue with Value Sets with entity keys as values" http://lists.oasis-open.org/archives/uddi-spec/200304/msg00063.html.

* cited by examiner

SUPPORT FOR MULTIPLE INTERFACE VERSIONS

BACKGROUND OF THE INVENTION

This invention relates to the field of supporting multiple interface versions, and more particularly, to supporting multiple versions of an interface where the interface involves side effects in addition to the main purpose to the interface.

Distributed computer systems have become more widespread as computer networks have developed. Distributed computer systems comprise multiple computer systems connected by one or more networks such that the resources of the computer systems can be shared. Processes instructed by a local computer system can be executed on a remote computer system. The connecting networks can include Local Area Networks (LANs), Wide Area Networks (WANs) and global networks such as the Internet.

One form of distributed architecture in which multiple computer processes may cooperatively perform tasks is under a "client-server" relationship. In such a relationship, a "client" or calling computer process issues or sends a request for a remote procedure to a "server" or receiving computer process that executes the procedure. It will be appreciated that whilst one computer process may function as a client which issues a procedure request and another may function as a server when it executes the procedure, any computer process may function as both a client and a server in different capacities. The terms "client" and "server" may also be applied to peer systems.

Requests are passed between application programs running on the client and server computer systems by communication described by the application programming interface (API). As new functionality is implemented in computer processes and environments, remote procedure APIs often may be enhanced to support the new functionality. As is common practice with computer applications, enhancements to an API are embodied in a new version of the API.

To support a new version of an API, both the client and the server utilizing the API must support the new version. However, in many distributed computer systems it is impossible or impractical to upgrade all clients and servers at the same time to a new version of a remote procedure API. This is particularly true in shared or public networks. Consequently, multiple versions of an API may exist in a distributed computer system.

In existing systems, multiple API versions are handled by allowing servers to support multiple versions, with clients usually supporting only single versions of an API. Clients can access both old and new versions simultaneously for as long as the clients may need to access the old versions.

The development of the Internet has resulted in the use of open or shared computing in which applications are freely and dynamically available to users via the Internet. Such systems result in loss of control and influence over the version of APIs used. Recent trends in the Internet are towards the use of Web Services whereby standard functions, associated with a particular industry or infrastructure requirement, are established by a consortium of companies and thus represent a standard interface. These include:

1. Mapping one version of an API call to another. For example, mapping a version 2 call to a corresponding version 3 call.

2. Re-implementing the older API version(s) to incorporate any new requirements introduced with the newest version.

BRIEF SUMMARY OF THE INVENTION

According to one aspect of the present invention, a method supports multiple interface versions comprising a current interface version and at least one earlier interface version. A call is received at an interface version. A data structure from the current interface version data structures is retrieved. An event comprising a reference to the call is fired. Listeners for events are provided. A listener initiates the processing of a side effect of the current interface version, if appropriate to the call, wherein a side effect is a process in addition to the main purpose of the interface.

According to another aspect of the present invention, a system supports multiple interface versions comprising a current interface version and at least one earlier interface version. The system includes a receiving device receiving a call at an interface version aa retrieving device retrieving a data structure from data structures associated with the current interface version, a firing device firing an event comprising a reference to the call, an event manager receiving events and having one or more listeners registered at the event manager, and a listener initiating the processing of a side effect of the current interface version, if appropriate to the call, wherein a side effect is a process in addition to the main purpose of the interface.

According to yet another aspect of the present invention, a computer program product supports multiple interface versions. The multiple interface versions comprise a current interface version and at least one earlier interface version. The computer program product comprises a computer usable medium having computer useable program code embodied therein. The computer useable program code comprises computer usable program code configured to receive a call at an interface version, computer usable program code configured to retrieve a data structure from the current interface version data structures, computer usable program code configured to fire an event including a reference to the call, computer usable program code configured to provide listeners for events, and computer usable program code configured to initiate the processing of a side effect of the current interface version, if appropriate to the call, wherein a side effect is a process in addition to the main purpose of the interface.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
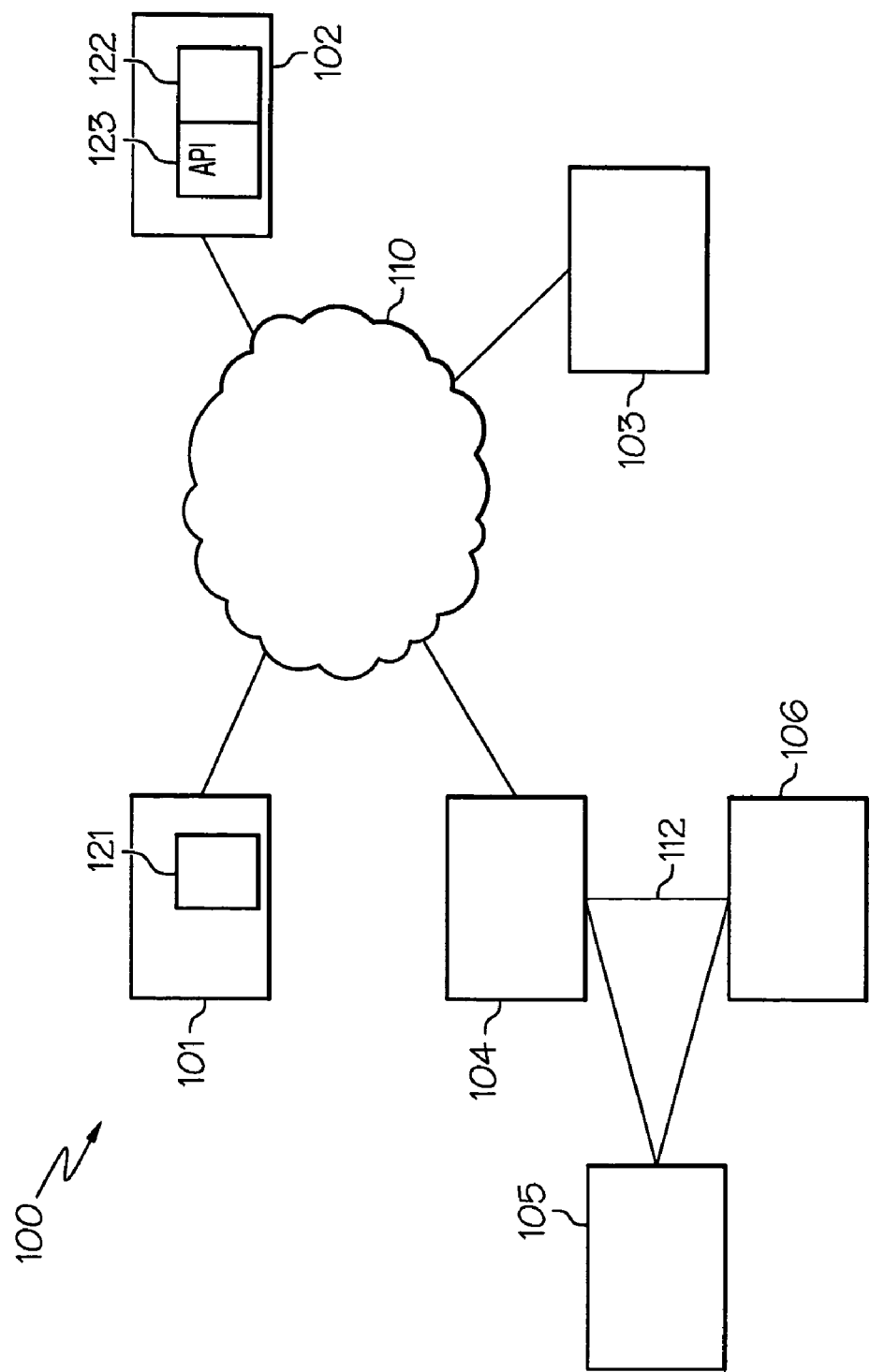
FIG. 1 is a schematic block diagram of an example configuration of a distributed computer system in accordance with the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to the drawings, a distributed computer system 100 is described. FIG. 1 is an illustration of a distributed computer system 100 which provides an example of the possible configurations of such a system 100. The nature of a distributed computer system 100 means that there is an infinite number of possible arrangements or configurations.

In FIG. 1, four computer systems 101, 102, 103, 104 are shown which are interconnected by a public network 110 which may be, for example, the Internet. One of the computer systems 104 is also connected to two further computer systems 105, 106 by a local area network (LAN) 112.

Each computer system 101, 102, 103, 104, 105, 106 may function as a client, a server or both. Each computer system generally includes a central processing unit (CPU), a non-volatile program storage device such as read only memory (ROM), a workspace such as random access memory (RAM) and a mass storage device such as a hard disk.

It should also be appreciated that although this description refers to communication between computer systems functioning as a client and a server, it also includes communication between computer processes operating on the same multi-tasking computer or processing system.

One of the computer systems 101 of FIG. 1 is shown functioning as a client and a second computer system 102 is shown functioning as a server. In distributed applications, the client 101 and server 102 engage in a relationship described by an interface that enables communication among distributed computer systems via a network 110. Through the interface, application programs 121, 122 distributed across a network can work together, communicating with each other and exchanging data to accomplish processing tasks. A sequence of communications between two application programs can accomplish one or more processing tasks.

The application programs include client applications 121, which are also referred to as invoking applications, which are resident on computer systems functioning as clients 101 and which accomplish tasks for end users. The application programs also include service applications 122 which are resident on computer systems functioning as servers 102 and which provide services to other programs. Together the application programs distributed across one or more networks perform distributed processing.

An API 123 is a description of the operations and associated parameter types used to invoke a service. The description can be used by a human programmer, probably making use of programming tools, to create a service application 122 which contains an invocation of the service. The interface description represents a contract between an invoking application 121 and a target service application 122.

An example which is used throughout this description is an implementation of the Universal Description, Discovery and Integration (UDDI) specifications. Web Services is a family of standards for working with businesses, developers and programs through open protocols, languages and APIs. The protocols include XML (Extensible Markup Language), SOAP (Simple Object Access Protocol), WSDL (Web Service Definition Language) and UDDI (Universal Description, Discovery and Integration). UDDI is the service discovery protocol for Web Services through which companies can find one another to conduct business.

UDDI has API versions 1, 2 and 3. It is a matter for implementations of UDDI to consider which versions should be supported; however, support for all three may be required as many clients may only have one of the earlier versions. Each new version may place a burden of complexity on the implementation.

As is demonstrated by UDDI, the server may require corrections or desire improvements to the API or its implementation and, in order to provide a reasonable quality of service to the client, these must be introduced without disrupting the client who may be using an earlier version of the API.

Figure 2:
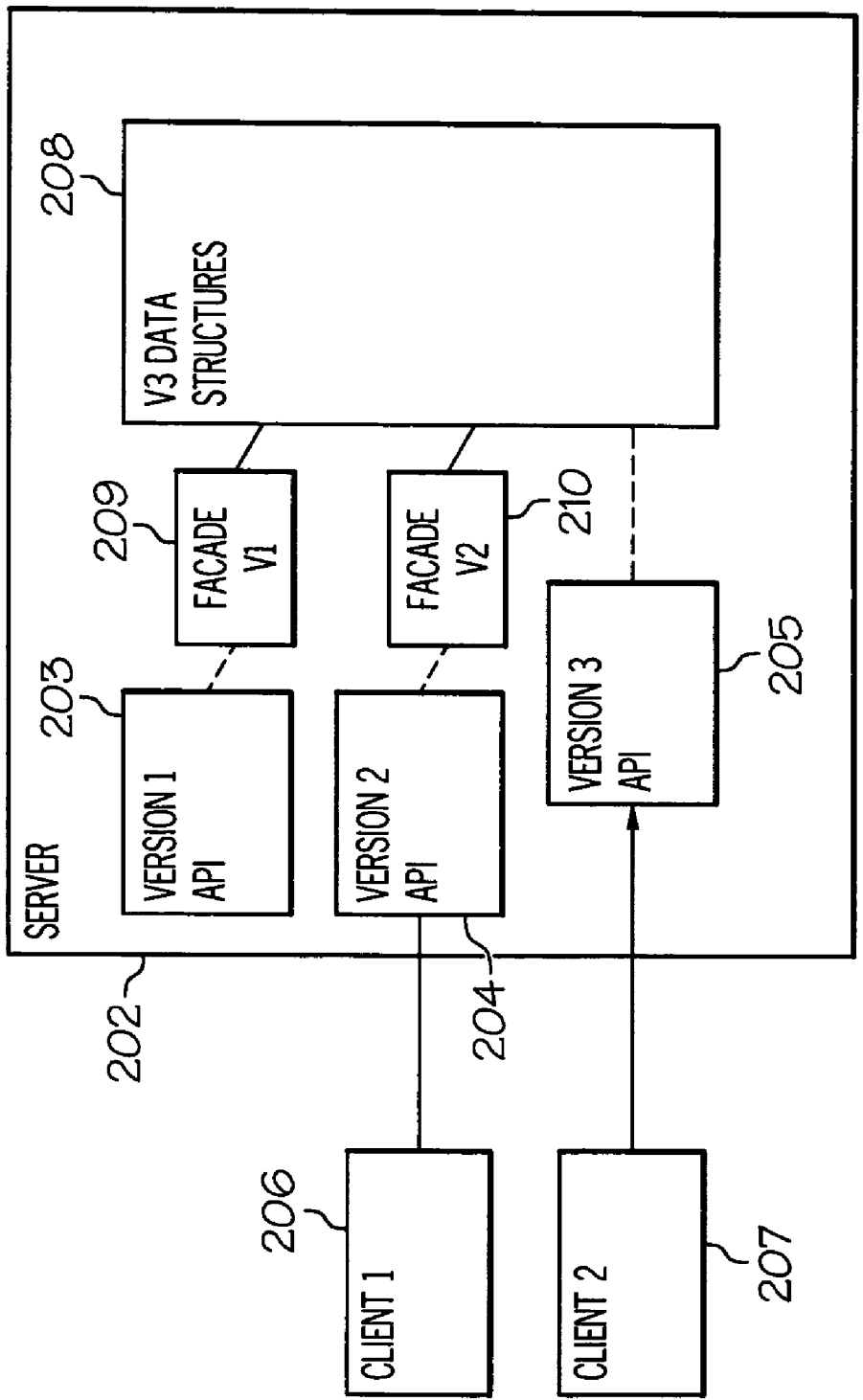
FIG. 2 is a schematic block diagram of a system including clients and a server with multiple API versions in accordance with the present invention.

A server supports multiple versions of an API as these are developed in order that clients can access the API using the version available to the client. This is illustrated in FIG. 2. A server 202 has three versions of an API, V1 203, V2 204, V3 205. A first client 206 uses a second version V2 204 of the interface and a second client 207 uses a third version V3 205 of the API which, in this case, is a most recent version of the API published by the server 202.

A new version of an API may have side effects which are procedures carried out by the API in addition to the main purpose of the API. Additional side effects may be added with new versions of an API.

Referring to FIG. 2, an embodiment is shown of a system supporting multiple versions of APIs in which the most recent version, V3 205 has data structures 208 used by the implementation of the API. Data structures are forms of organizational schemes, such as records or arrays, that can be applied to data to facilitate interpreting data or performing operations on it. Data structures of previous, superceded versions of an API (i.e. V1 203 and V2 204) are replaced by facades or wrappers 209, 210. The facades 209, 210 map the superseded data structures to the current version of the data structure 208. This allows the existing superceded API code to continue to work in the context of the most recent API version code without change. The facades 209, 210 allow the underlying data structures 208 of the most recent API version to be retrieved when necessary.

Figure 3:
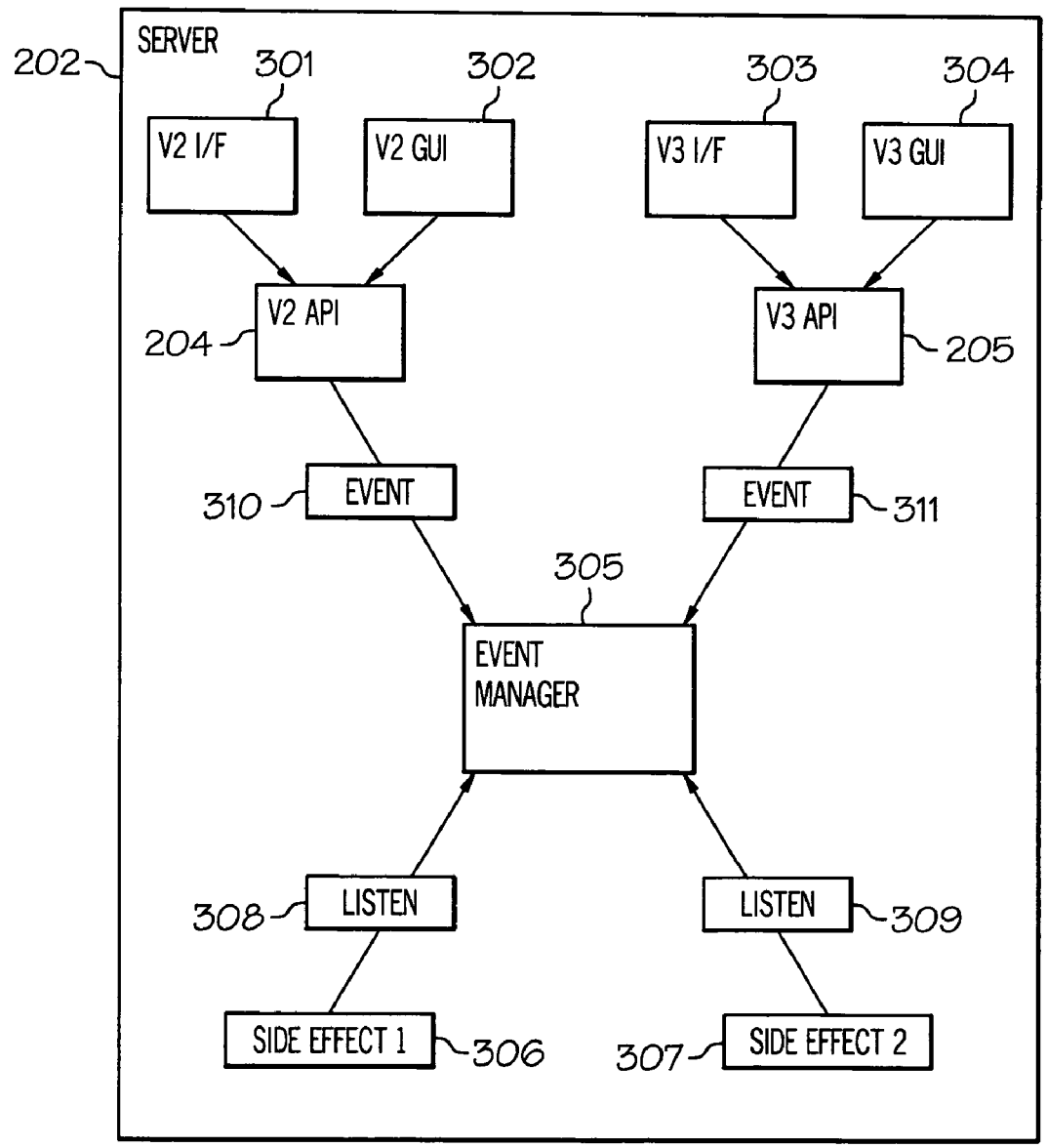
FIG. 3 is schematic block diagram of a system including event management with multiple API versions in accordance with the present invention.

Referring to FIG. 3, a server 202 is shown with multiple API versions. In the illustrated embodiment, there are two API versions, V2 204 and V3 205, shown. The interfaces 301, 302, 303, 304 through which the API versions 204, 205 are driven are unaware of the multiple versions of APIs and maintain constant public interfaces. Such interfaces 301, 302, 303, 304 may be, for example, interfaces 301, 303 using SOAP calls, or graphical user interfaces 302, 304, for manually driving an API etc., which drive a common API code.

An event manager 305 is provided and additional side effects 306, 307 are registered as listeners 308, 309 to the event manager 305. The API versions 204, 205 fire events 310, 311. The side effects 306, 307 operating as listeners 308, 309 are written in the latest version code and expect data structures of the latest version of the API.

Figure 4:
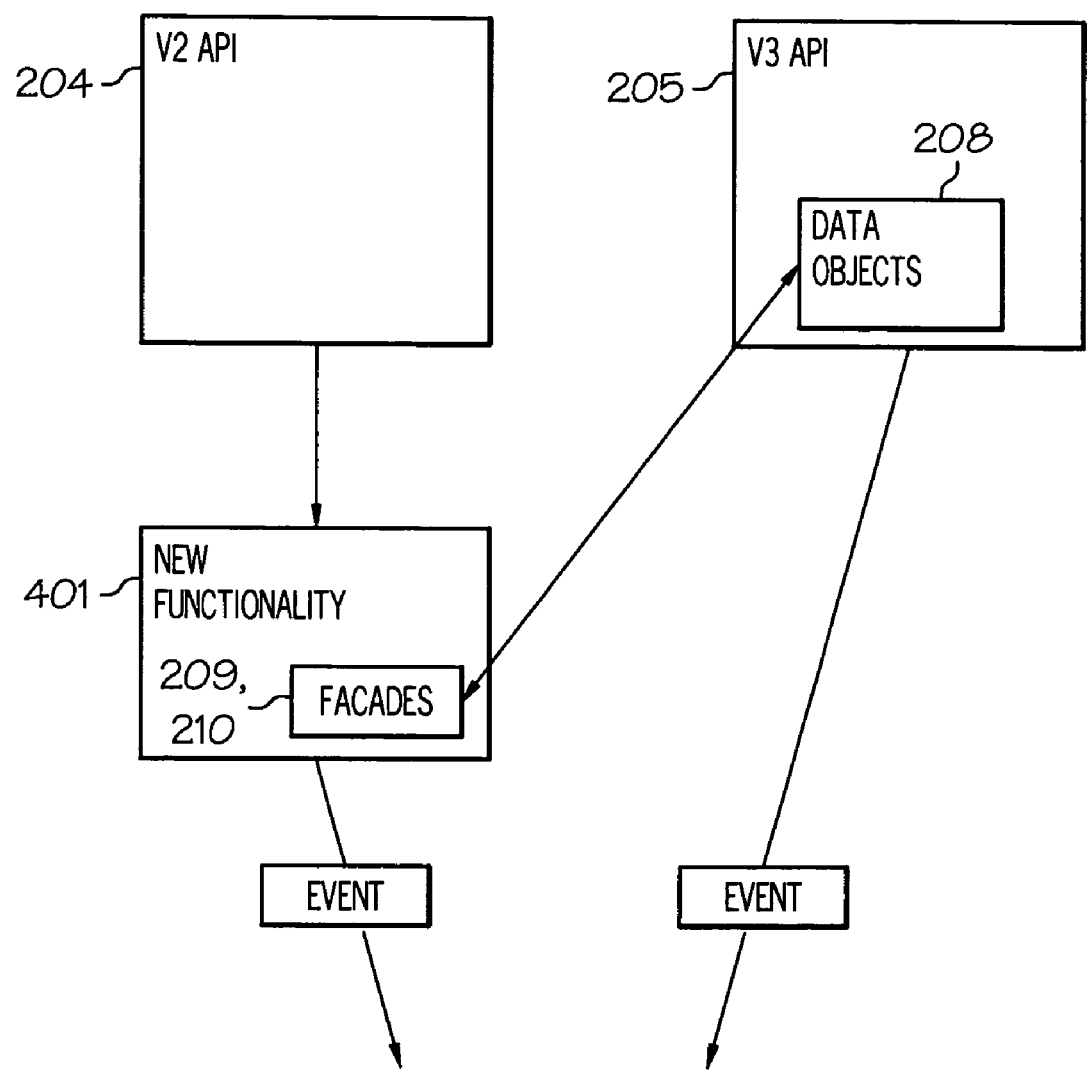
FIG. 4 is a detail of the multiple API versions of the system of FIG. 3.

The described method and system also provide a means of dynamically registering or unregistering listeners which enables side effects of the latest version of the API to be added and removed. Referring to FIG. 4, a detail of the server 202 of FIG. 3 is shown. The superseded API version 204 has additional functionality 401 provided as a modification to the API code to retrieve objects behind the facades 209, 210 and to fire events. A facade 209, 210 includes a method to obtain a reference from the data structures 208 of the most recent API version 205 and this reference is included in the event fired by the superseded API version 204. Only the additional functionality 401 of the superseded API versions has knowledge of the multiple versions. The data structure classes are separate from the API code but related to it and the data structures are reimplemented in terms of the latest version data structures.

An embodiment of the described method and system is now given in the context of a UDDI registry. A UDDI registry provides the facility for businesses to register their service and consumers to obtain details of registered businesses. The registry provides these facilities through an interface that may be upgraded in order to add improved and new functionality.

As an example, versions 2 and 3 of the UDDI API both provide support for an API call to save details of a business, but in version 3 this has an additional "subscription" side effect of sending out details of the business to subscribers who have registered an interest in businesses of the type of the newly saved business. A problem occurs when it is required to provide the new version 3 side effects for calls made through the version 2 API because this requires the code that implements the version 2 API to be modified to provide the new support. Another example of a side effect would be "replication" which copies definitions to other UDDI implementations.

According to the described method and system this problem is solved by registering the side effects with an event manager as listeners to events which are generated by the processing of an API call which requires their effect and generating an event when processing an API call relevant to the function of the API call. As a result, for example, the processing of an API call in UDDI to save business details generates a "save business" event and the subscription side effect registers as a listener to the "save business" events. Now whether the implementation of the version 2 or version 3 API generates a "save business" event the "subscription" side effect is called and accordingly the version 2 implementation adopts the version 3 side effect without modification.

Superseded API versions require a small change to the API code to retrieve the underlying data structure of the most recent API version and to fire an event indicating, for example, a call type (such as a business entity being published). The superseded API version code does not know how many listeners there are for the event so once this small change has been made the code is isolated from the details of how many listeners there are and what they will do with the event.

The corresponding most recent API version code does exactly the same thing except that it is natively working with the most recent data structures so it does not need to retrieve them, but it fires exactly the same event. The registered listeners do not know if the event was fired as a result of a superseded API version request or a most recent API version request.

If a new API version is produced (e.g. V4), the previously superseded data structure facades (V1/V2) will need to be updated to use the native data structures of the new most recent API version (V4) but apart from that the existing API code (V1/V2) will not need to be updated. The previously most recent API version code (V3) will need to be updated to use also new data structure facades to the most recent API version (V4) data structures. The previously most recent API version code (V3) that fires events will also need to be updated to retrieve the underlying data structure when it fires the event.

Figure 5A:
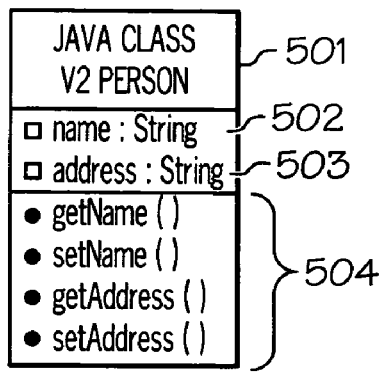
FIGS. 5A to 5C are UML (Unified Modeling Language) class diagrams in accordance with the present invention.
Figure 5B:
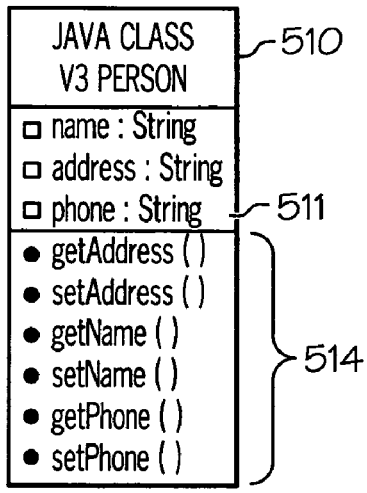
Figure 5C:
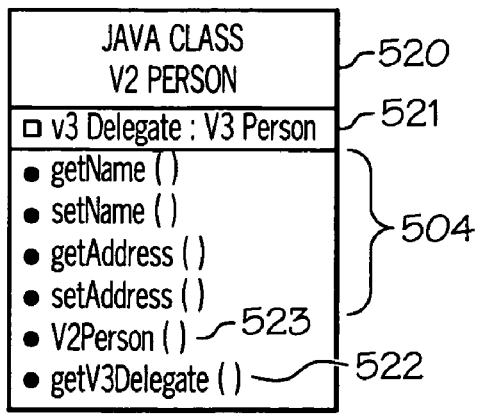

Referring to FIGS. 5A to 5C, UML class diagrams are provided to illustrate the use of facades. FIG. 5A shows a version 2 class 501 for registering a person's details in a directory. The class 501 consists of private storage for a name 502 and an address 503 for the person and public methods 504 for getting and setting the name and address. FIG. 5B shows a version 3 equivalent class 510 which has private storage of a phone number 511 added with corresponding public methods 514 for getting and setting the phone number 511 of the person.

FIG. 5C shows a version 2 facade 520 which has the same public methods 504 as the original version 2 class 501 for registering a person of getting and setting the name and address. So as far as the bulk of the version code is concerned, it behaves just like the original version 2 person class 501. However, the storage 502, 503 for the name and address have been removed and replaced with a single reference 521 to the version 3 person class 511.

When an instance of the version 2 facade is created, it automatically creates an instance of the version 3 class, and the public methods are delegated to the version 3 class. The facade 520 also has an extra method, get V3Delegate( ) 522, which returns a reference to the underlying version 3 class instance. This method is called by the new version 2 code that fires an event, and the instance of the version 3 person class that it returns is the object that is associated with the event.

The facade 520 also has a constructor method 523 to construct an instance of the class. This is optional in the latest-version data structures but necessary in the facades to allow the underlying latest-version objects to be created.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A method for supporting multiple interface versions in a server, the server being capable of receiving calls at a current interface version and at least one earlier interface version, comprising:
   receiving a call at an interface version at the server;
   retrieving a data structure from the data structures of the current interface version in the server;
   firing an event comprising a reference to the call; and
   in response to a listener detecting said event, initiating processing of a side effect of the current interface version, if appropriate to the call, wherein said side effect comprises a process specifically associated with said current interface version that is not associated with said call in said interface version at which said call is received.

2. The method as claimed in claim 1, further comprising obtaining the reference to the call from the data structures of current interface version for inclusion in the event.

3. The method as claimed in claim 1, further comprising mapping a data structure of an earlier interface version to a data structure of the current interface version.

4. The method as claimed in claim 3, further comprising: creating a facade instance and automatically creating an instance of the current data structure; and the facade delegating methods to the instance of the current data structure.

5. The method as claimed in claim 1, further comprising adding listeners to add side effects to the current interface version.

6. The method as claimed in claim 1, further comprising removing listeners to remove side effects from the current interface version.

7. A method as claimed in claim 1, wherein the interface is an application programming interface in a distributed computer system in which a call is received from a client application and the multiple versions of the interface are provided by the server.

8. A method as claimed in claim 7, wherein the application programming interface is for a Web Service application.

9. A system for supporting multiple interface versions comprising a current interface version and at least one earlier interface version, the system comprising:
   a server comprising a processor and a memory communicatively coupled to said processor, said memory being configured to store computer executable code such that said server, upon execution of said computer executable code, is configured to implement:
   a receiving module receiving a call at an interface version;
   a retrieving module retrieving a data structure from data structures associated with the current interface version;
   a firing module firing an event comprising a reference to the call;
   an event manager receiving events and having one or more listeners registered at the event manager; and
   a listener initiating processing of a side effect of the current interface version in response to detecting said event, if appropriate to the call, wherein said side effect comprises a process specifically associated with said current interface version that is not associated with said call in said interface version at which said call is received.

10. The system as claimed in claim 9, in which said event comprises a reference to the call in terms of the current interface.

11. The system as claimed in claim 9, in which said server is further configured to implement a facade for an earlier interface version to map a data structure of said earlier interface version to a data structure of the current interface version.

12. The system as claimed in claim 11, in which said server is further configured to implement a creation module configured to create said facade and automatically create an instance of a current data structure, such that the facade is configured to delegate methods to the instance of the current data structure.

13. The system as claimed in claim 9, wherein the interface is an application programming interface in a distributed computer system in which a call is received from a client application.

14. The system as claimed in claim 13, wherein the application programming interface is for a Web Service application.

15. A computer program product for supporting multiple interface versions in a server comprising a current interface version and at least one earlier interface version, the computer program product comprising:
a computer readable storage medium having computer useable program code embodied therein, the computer useable program code comprising:
computer usable program code configured to receive a call at an interface version;
computer usable program code configured to retrieve a data structure from data structures associated with the current interface version;
computer usable program code configured to fire an event including a reference to the call; and
computer usable program code configured to, in response to detecting said event, initiate processing of a side effect of the current interface version, if appropriate to the call, wherein said side effect comprises a process specifically associated with said current interface version that is not associated with said call in said interface version at which said call is received.

16. The computer program product as claimed in claim 15, further comprising computer usable program code configured to obtain the reference to the call from the current interface version data structures for inclusion in the event.

17. The computer program product as claimed in claim 15, further comprising computer usable program code configured to map the data structure of an earlier interface version to a data structure of the current interface version.

18. The computer program product as claimed in claim 17, further comprising computer usable program code configured to create a facade instance and automatically creating an instance of a current data structure, and the facade delegating methods to the instance of the current data structure.

19. The computer program product as claimed in claim 15, further comprising computer usable program code configured to add listeners to add side effects to the current interface version.

20. The computer program product as claimed in claim 15, further comprising computer usable program code configured to remove listeners to remove side effects from the current interface version.

* * * * *